(12) United States Patent
Zhu et al.

(10) Patent No.: US 10,936,241 B2
(45) Date of Patent: Mar. 2, 2021

(54) METHOD, APPARATUS, AND COMPUTER PROGRAM PRODUCT FOR MANAGING DATASETS

(71) Applicant: EMC IP Holding Company LLC, Hopkinton, MA (US)

(72) Inventors: Jian Zhu, Shanghai (CN); Lu Lei, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 113 days.

(21) Appl. No.: 16/296,171

(22) Filed: Mar. 7, 2019

(65) Prior Publication Data

US 2020/0104069 A1     Apr. 2, 2020

(30) Foreign Application Priority Data

Sep. 30, 2018   (CN) .......................... 201811156532.9

(51) Int. Cl.
  *G06F 7/00*   (2006.01)
  *G06F 3/06*   (2006.01)
  *G06F 12/02*  (2006.01)
(52) U.S. Cl.
  CPC .......... *G06F 3/0652* (2013.01); *G06F 3/0604* (2013.01); *G06F 3/067* (2013.01); *G06F 12/0238* (2013.01)

(58) Field of Classification Search
  CPC ...... G06F 16/435; G06F 16/48; G06F 3/0652; G06F 3/0604; H04N 21/4661; H04N 21/4667; H04F 3/067; H04F 12/0238
  USPC .................................................. 707/600–899
  See application file for complete search history.

(56) References Cited

U.S. PATENT DOCUMENTS

2016/0350419 A1* 12/2016 Tao ........................ G06F 16/957

* cited by examiner

*Primary Examiner* — Isaac M Woo
(74) *Attorney, Agent, or Firm* — Amin, Turocy & Watson, LLP

(57) ABSTRACT

The present disclosure relates to a method, apparatus and computer program product for managing datasets. According to example implementations of the present disclosure, there is provided a method for managing datasets. In the method, a first dataset comprising a first number of data elements and a second dataset comprising a second number of data elements may be obtained. The first number may be compared with the second number. One of the first dataset and the second dataset may be selected as a search dataset and the other may be selected as a traverse dataset based on a comparison result. The search dataset may be searched for a candidate data element, here the candidate data element has an association relation with a data element comprised in the traverse dataset. Further, there is provided an apparatus and computer program product for managing datasets.

20 Claims, 8 Drawing Sheets

US 10,936,241 B2

METHOD, APPARATUS, AND COMPUTER PROGRAM PRODUCT FOR MANAGING DATASETS

RELATED APPLICATION

The present application claims the benefit of priority to Chinese Patent Application No. 201811156532.9, filed on Sep. 30, 2018, which application is hereby incorporated into the present application by reference herein in its entirety.

FIELD

Various implementations of the present disclosure relate to datasets, and more specifically, to a method, apparatus and computer program product for determining data elements with an association relation in two datasets.

BACKGROUND

With the development of computer technologies, a wide range of datasets have been used to store various types of data. In application environments, often there is a need to determine whether data elements with an association relation exist in two datasets. Since this operation serves as a basis for subsequent operations, it is desirable to find data elements with an association relation more efficiently.

SUMMARY

Therefore, it is desirable to develop and implement a technical solution for managing datasets more effectively. It is desired that the technical solution can be compatible with existing application environments and manage the application system more effectively by reconstructing various configurations of existing application environments.

According to a first aspect of the present disclosure, there is provided a method for managing a storage system. In the method, a first dataset comprising a first number of data elements and a second dataset comprising a second number of data elements may be obtained. The first number may be compared with the second number. One of the first dataset and the second dataset may be selected as a search dataset and the other may be selected as a traverse dataset based on a comparison result. The search dataset may be searched for a candidate data element, here the candidate data element having an association relation with a data element comprised in the traverse dataset.

According to a second aspect of the present disclosure, there is provided an apparatus for processing a computing task, comprising: at least one processor; a volatile memory; and a memory coupled to the at least one processor, the memory having instructions stored thereon, the instructions, when executed by the at least one processor, causing the apparatus to perform acts including: obtaining a first dataset comprising a first number of data elements and a second dataset comprising a second number of data elements; comparing the first number with the second number; selecting, based on a comparison result, one of the first dataset and the second dataset as a search dataset and selecting the other as a traverse dataset; and searching in the search dataset for a candidate data element, the candidate data element having an association relation with a data element comprised in the traverse dataset.

According to a third aspect of the present disclosure, there is provided a computer program product. The computer program product is tangibly stored on a computer readable medium and comprises machine executable instructions which, when executed, cause the machine to implement a method according to the first aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

Various implementations of the present disclosure will be described in more details with reference to the drawings. Although the drawings illustrate some of the implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
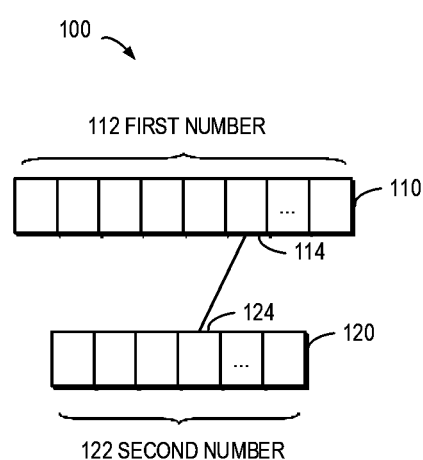
FIG. 1 schematically illustrates a block diagram of a dataset which may be managed using a method of the present disclosure.

FIG. 1 schematically shows a block diagram 100 of datasets which can be managed using a method of the present disclosure. As depicted, a first dataset 110 may comprise a first number 112 of data elements, and a second dataset 120 may comprise a second number 122 of data elements. It will be understood here formats of data elements in the first dataset 110 and the second dataset 120 may be same or different (so long as the two formats have an association relation). In FIG. 1, the first dataset 110 comprises a data element 114, the second dataset 120 comprises a data element 124, and a connecting line between the two data elements represents the two data elements have an association relation. The meaning of the association relation will be described by way of a specific example.

For example, the first dataset 110 and the second dataset 120 may be stored as a list, a set or in other form. Specifically, the two datasets may be stored in the same or different forms. In one example, the first dataset 110 may be a list of identifiers of objects used by a first user in an object-based storage system, and the second dataset 120 may be a list of identifiers of objects used by a second user. At this point, searching for data elements with an association relation in the first dataset 110 and the second dataset 120 may refer to the process of determining objects used by both the first user and the second user.

In another example, the first dataset 110 may be a list of identifiers of objects stored in an object-based storage system, and the second dataset 120 may be a list of identifiers of to-be-reclaimed chunks. Here, searching for data elements with an association relation in the first dataset 110 and the second dataset 120 may refer to the process of determining whether various chunks in a to-be-reclaimed list are used by objects in the storage system. In this example, if no data elements with an association relation are found, then it means no object uses a chunk in the to-be-reclaimed list, at this point a reclaim operation may be performed. It will be understood illustrated above are merely two specific examples for managing datasets, and other example may further be involved in other application environment.

There have been proposed technical solutions for determining data elements with an association relation in two datasets. In these technical solutions, one dataset is searched per data element to see if there exists a data element matching each data element in another dataset. However, when the dataset comprises a large number of data elements, huge time overhead will be caused. At this point, it becomes a focus of research regarding how to determine with higher efficiency whether there exist data elements with an association relation in two datasets.

To at least partially solve problems in existing technical solutions, implementations of the present disclosure propose a method for processing datasets. In the method, a first dataset comprising a first number of data elements and a second dataset comprising a second number of data elements may be obtained. The first number may be compared with the second number, and based on a comparison result, one dataset from the first dataset and the second dataset may be selected as a search dataset. The other dataset may be selected as a traverse dataset. A candidate data element may be searched for in the search dataset, here the candidate data element has an association relation with a data element comprised in the traverse dataset.

It will be understood for the same dataset, a search operation and a traverse operation have different complexities, and further corresponding time and computing resource overheads differ. Therefore, with the above example implementations, a comparison may be made between the numbers of data elements comprised in two datasets, so as to determine which dataset is subjected to the search operation. In this way, data elements with an association relation in the first dataset and the second dataset may be obtained in a more efficient manner.

Figure 2:
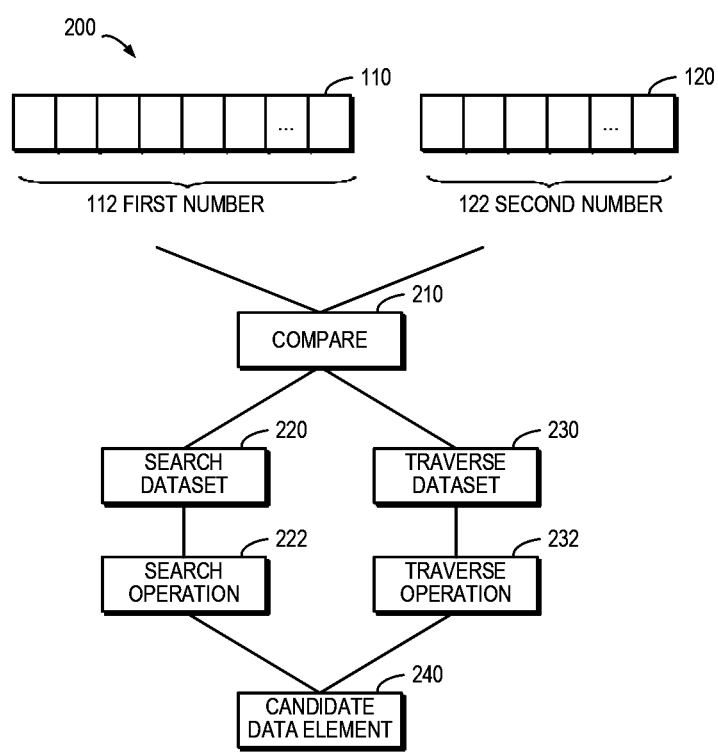
FIG. 2 schematically illustrates a block diagram for managing datasets according to implementations of the present disclosure.

With reference to FIG. 2, description is presented below to more details about the present disclosure. FIG. 2 schematically shows a block diagram 200 for managing datasets according to implementations of the present disclosure. As depicted, a first dataset 110 comprises a first number 112 of data elements, and a second dataset 120 comprises a second number 122 of data elements. At block 210, the first number 112 may be compared with the second number 122, and a search dataset and a traverse dataset may be determined based on a comparison result. Here the search dataset refers to a dataset to which a search operation is performed, and the traverse dataset refers to a dataset to which a traverse operation is performed. In the implementations, one dataset of the first dataset 110 and the second dataset 120 may be selected as a search dataset 220, and then the other dataset may be selected as a traverse dataset 230. A search operation 222 may be performed to the search dataset 220 and a traverse operation 232 may be performed to the traverse dataset 120, so as to find a candidate data element 240. It will be understood here the candidate data element 240 has an association relation with a data element in the traverse dataset 230.

Figure 3:
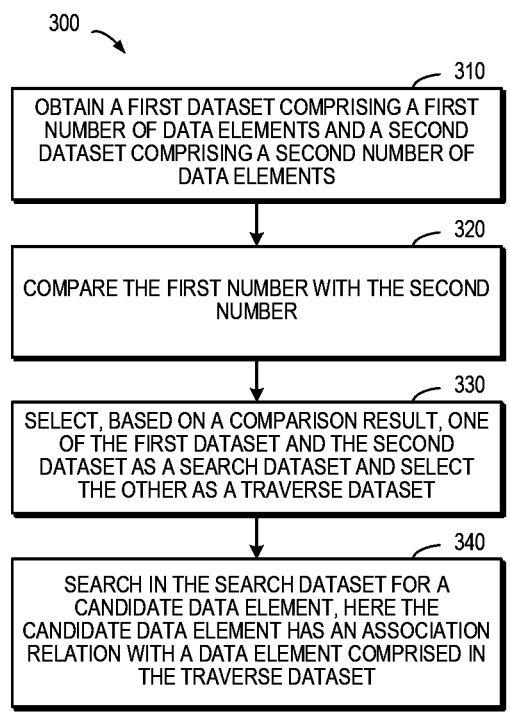
FIG. 3 schematically illustrates a flowchart of a method for managing datasets according to implementations of the present disclosure.

FIG. 3 schematically shows a flowchart of a method 300 for managing datasets according to implementations of the present disclosure. At block 310, a first dataset 110 comprising a first number 112 of data elements and a second dataset 120 comprising a second number 122 of data elements may be obtained. The first dataset 110 and the second dataset 120 may be stored based on multiple data structures, e.g. may be stored as a list, a chain table, a set or other data structure. It will be understood the storage mode of the two datasets is not limited here, and the two datasets may be stored in same or different modes.

At block 320, the first number 112 is compared with the second number 122. At block 330, based on a comparison result, one dataset of the first dataset 110 and the second dataset 120 is selected as a search dataset 220, and the other dataset is selected as a traverse dataset 230. In this process, if the first number 112 and the second number 122 are equal, then either of the two datasets may be selected as the search dataset 220, and the other may be selected as the traverse dataset 230. If the first number 112 and the second number 122 are different, then a dataset corresponding to a larger number may be selected as the search dataset 220, and the other may be selected as the traverse dataset 230. Detailed description is presented below to more details on how to select the search dataset 220 and the traverse dataset 230.

According to example implementations of the present disclosure, a dataset corresponding to a larger value between the first number 112 and the second number 122 may be selected as the search dataset 220. Specifically, if the first number 112 is above the second number 122, then the first dataset 110 may be selected as the search dataset 220, and the second dataset 120 may be selected as the traverse dataset 230. For another example, if the first number 112 is below the second number 122, then the second dataset 120 may be selected as the search dataset 220, and the first dataset 110 may be selected as the traverse dataset 230.

It will be understood for the same dataset, the complexity of a search operation is usually lower than that of a traverse operation. The larger the number of data elements in a dataset is, the larger the difference in complexity is. Therefore, with the above example implementations, a search operation may be performed to a dataset comprising more data elements, and a traverse operation may be performed to a dataset comprising less data elements. In this way, data elements with an association relation in the first dataset and the second dataset may be obtained more efficiently.

At block 340, the search dataset 220 is searched for a candidate data element, the candidate data element may have an association relation with a data element comprised in the traverse dataset 230. According to example implementations of the present disclosure, each data element in the traverse dataset may be traversed in order. Further, for a given data element in the traverse dataset 230, the search dataset 220 may be searched so as to determine whether in the search dataset 220 there exists a candidate data element 240 with an association relation with the given data element. With the above example implementations, since the traverse dataset 230 comprises a less number of data elements, performing the traverse operation to the traverse dataset 230 will not cause higher time overhead. On the other hand, although the search dataset 220 comprises more data elements, since the search operation is less complex, high time overhead will not be caused either. In this way, data elements with an association relation in the first dataset and the second dataset will be obtained more efficiently.

According to example implementations of the present disclosure, an index of the search dataset may be obtained first. It will be understood the index of a dataset may be based on multiple techniques. For example, the index may be an index based on a tree structure such as a binary tree and a B+ tree, or may be a hash index based on a hash function. In the search dataset 220, a candidate data element having an association relation with the given data element may be found in the search dataset 220 based on the index. Since the index can accelerate the time efficiency of the search operation, time overhead for searching for the candidate data element in the search dataset may be further reduced with the above example implementations. Hereinafter, more details about the search based on the index will be described with reference to FIG. 4.

Figure 4:
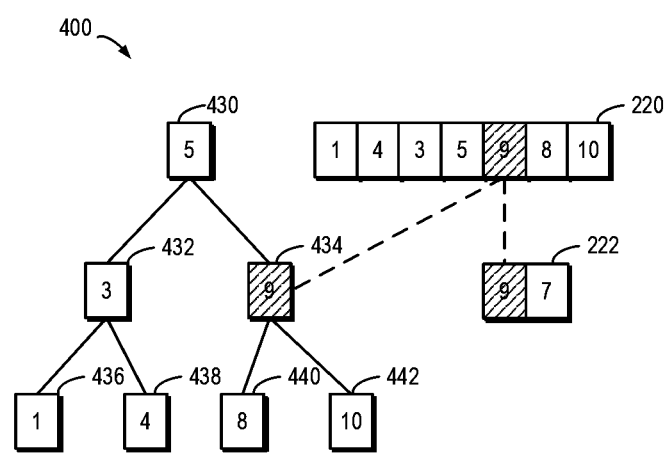
FIG. 4 schematically illustrates a block diagram of a search based on an index of a dataset according to implementations of the present disclosure.

FIG. 4 schematically shows a block diagram 400 of a search based on an index of a dataset according to implementations of the present disclosure. It will be understood the index of the dataset may be built based on multiple manners. Although FIG. 4 shows the index is built based on a binary tree, in other implementations, the index may further be built based on a B+ tree, a multi-way tree or a hash function. In FIG. 4, the search dataset 220 may comprise seven data elements, and the traverse dataset 222 may comprise two data elements. For the sake of brief description, suppose data elements in the two datasets are all integers, various data elements in the search dataset 220 are integers 1, 4, 3, 5, 9, 8 and 10 respectively, and various data elements in the traverse dataset 222 are integers 9 and 7 respectively.

The left of FIG. 4 shows an index based on a binary tree, the index comprises: a root node 430, first-level nodes 432 and 434, and second-level nodes 436, 438, 440 and 442. In the implementation, each data element in the traverse dataset 222 may be processed one by one. First of all, a first data element (with a value of 9) in the traverse dataset 222 may be obtained, at which point a data element with a value of 9 in the search dataset 220 may be searched for based on the index. The search process is as below: from the root node 430, values 5 and 9 at the root node 430 are compared; since 9>5, the right child tree of the root node 430 will be traversed. The operation proceeds to the right node 434, whose value is 9. At this point, a data element matching the first data element in the traverse dataset 222 is found in the search dataset 220, and further the found data element may be marked as a candidate data element 240.

Next, a second data element (with a value of 7) may be obtained in the traverse dataset 222, at which point a data element with a value of 7 in the search dataset 220 may be searched for based on the index. The search process is as below: from the root node 430, values 5 and 7 at the root node 430 are compared; since 7>5, the right child tree of the root node 430 will be traversed. The operation proceeds to the right node 434, whose value is 9. Since 9>7, the left child tree of the node 434 will be traversed, and the operation proceeds to the left node 440. A value of the node 440 is 8. Since 8>7, and the node 440 has no left child tree, the search process ends. In the search dataset 220 there exists no data element matching the second data element in the traverse dataset 222.

With the above described approach and based on the index of the search dataset 220, data elements with an association relation in two datasets may be determined more quickly. It will be understood FIG. 4 only illustrates a circumstance where both of two datasets comprise less data elements, in a real application environment, and usually two datasets comprise tens of and even hundreds of thousands of data elements. Hereinafter, a comparison in complexities for determining data elements with an association relation in two datasets will be made based on a specific formula. Suppose the first number 112 is denoted as N, the second number 122 is denoted as M, and N>M, then at this point the first dataset 110 is the search dataset 220, and the second dataset 120 is the traverse dataset 230. When the search dataset 220 is constructed with the index being a binary tree, the complexity of the search operation is $O(\log_2 N)$, and the complexity of the traverse operation is $O(M)$. At this point, the overall complexity for determining data elements with an association relation in the two datasets by using the method of the present disclosure is $O(\log_2 N*M)$. Suppose N=100000 and M=2, then the overall complexity with the method of the present disclosure is:

$$O(\log_2 N*M)=O(\log_2 100000*2)\approx 33$$

In conventional technical solutions, no effort is made to compare the first number 112 with the second number 122, but the second dataset 120 is directly searched to see whether there exists a data element having an association relation with each data element in the first dataset 110. At this point, the complexity for performing the traverse operation to the first dataset 110 is $O(N)$, and the complexity for performing the search operation to the second dataset 120 is $O(\log_2 M)$. Continuing the foregoing example, the overall complexity with the conventional technical solution is:

$$O(N*\log_2 M)=O(100000*\log_2 2)=100000$$

In the foregoing example, 33<<100000. It can be seen the overall complexity with the method of the present disclosure is far lower than that of the conventional technical solution. Further, the execution efficiency with the method of the present disclosure will be far higher than the efficiency of the conventional technical solution. It will be understood illustrated above is merely a comparison in complexities when a binary tree-based index is used. When the index is built using other approach, the calculation formula of complexity will vary. For example, when the index is built based on a hash function, the complexity of the search operation is 1. At this point, the complexity with the method of the present disclosure will be $O(1*M)=O(2)$.

Figure 5:
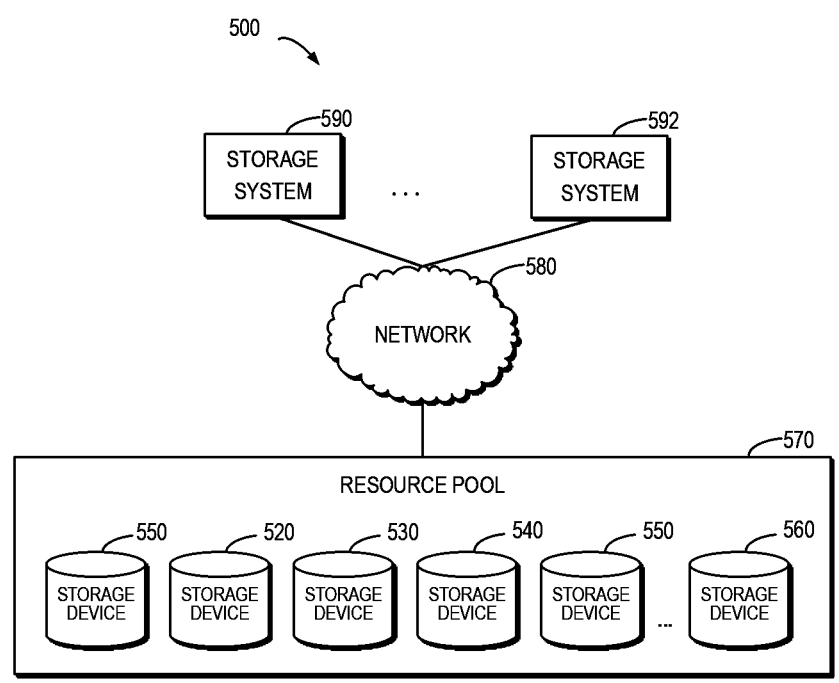
FIG. 5 schematically illustrates a block diagram of a storage system in which a method of the present disclosure may be implemented.

General description has been presented regarding how to determine data elements associated with each other in two datasets. Hereinafter, specific application of the method according to example implementations of the present disclosure in the storage system field will be described in conjunction with an application environment of the storage system. A variety of storage systems has been developed. Specifically, FIG. 5 shows a schematic view 500 of a storage system in which the method of the present disclosure may be implemented. As depicted, there may be provided a resource pool 570, which may comprise multiple storage devices 510, 520, 530, 540, 550, . . . , and 560. According to example implementations of the present disclosure, the storage device may further be a virtual storage device. One or more storage systems may be provided based on the resource pool 570. For example, storage systems 590 and 592 may access storage space in storage devices in the resource pool 570 via a network, so as to provide data access service to users. In the implementations, the storage system 590 may be an object-based storage system, and more details about the object-based storage system will be described with reference to FIG. 6 below.

Figure 6:
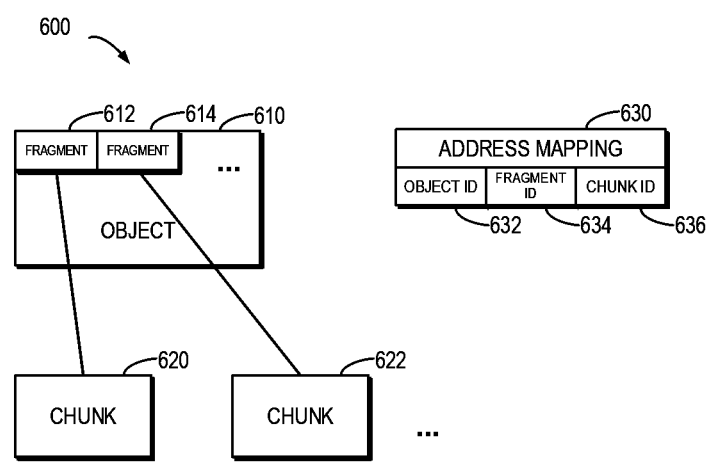
FIG. 6 schematically shows a block diagram of an address mapping of a storage system according to implementations of the present disclosure.

FIG. 6 schematically shows a block diagram 600 of an address mapping 630 of the object-based storage system 590 according to implementations of the present disclosure. The storage system 590 may comprise multiple objects, for example, an object 610 may be one of objects in the storage system. The object 610 may comprise multiple fragments 612, 614, etc. At this point, since the storage system 590 is a distributed storage system, the multiple fragments 612 and 614 in the object 610 may be stored in different chunks 620, 622 respectively. In order to record where various fragments in the object are stored, the storage system 590 may comprise an address mapping 630 for describing an association relation between at least one fragment comprised in the object and at least one chunk.

As shown in FIG. 6, the address mapping 630 may comprise: an object ID 632, a fragment ID 634 (representing the ID of each fragment in the object) and a chunk ID 636 (representing the ID of a chunk where a certain fragment is stored). Each entry in the address mapping 630 may be generated based on each fragment in each object in the storage system 590, so that the address mapping 630 can describe in which chunk each fragment in each object is stored. It will be understood the address mapping 630 in FIG. 6 is merely a schematic data structure. According to example implementations of the present disclosure, the address mapping 630 may further comprise more or less fields. For example, the address mapping 630 may comprise: a fragment ID field for uniquely indicating each fragment in each object; and a chunk ID field for uniquely indicating in which chunk a fragment is stored.

According to example implementations of the present disclosure, the above-described method may be implemented in an object-based storage system. For example, the first dataset may comprise an identifier of at least one object in the object-based storage system, and the second dataset may comprise an identifier of at least one chunk to be reclaimed from the storage system. In the running process of the storage system, often arises a circumstance where a chunk which might be used no longer needs to be reclaimed. To ensure the reliability of the storage system, it needs to be verified before the reclaim that the chunk in the reclaim list is a chunk which is no longer used by any object in the storage system. With the foregoing example implementations, the process of verifying the reclaim list may be accelerated, and further the efficiency of garbage collection of the storage system may be improved.

According to example implementations of the present disclosure, the given data element is an object identifier of a given object of the at least one object. Further, the storage system may comprise an address mapping, here the address mapping may describe an association relation between at least one fragment comprised in the at least one object and the at least one chunk. Chunks in which fragments in objects in the storage system are stored may be found from a list of chunk identifiers based on the address mapping. Specifically, in response to the address mapping indicating an object represented by the given object identifier has an association relation with a chunk represented by a given chunk identifier in the second dataset, the given chunk is identified as the candidate data element. With the foregoing example implementations, chunks which are still used by objects in the storage system and do not satisfy the reclaim condition may be quickly found from the to-be-reclaimed list.

It will be understood the object might involve a large amount of data and multiple chunks might be involved during storage. For example, the object may be divided into multiple fragments, and each fragment may be located at a different chunk. According to example implementations of the present disclosure, at least one fragment comprised in an object represented by the object identifier may be determined based on the address mapping, and then each fragment is processed. If one of the at least one fragment has an association relation with a chunk represented by the given chunk identifier, i.e. the fragment is stored in a chunk represented by the given chunk identifier, then the given chunk may be identified as the candidate data element.

With the foregoing example implementations, each fragment in the object may be quickly verified one by one, and further it may be prevented that some fragment(s) in the object is(are) stored in one or more chunks in the to-be-reclaimed list and are reclaimed mistakenly.

Figure 7:
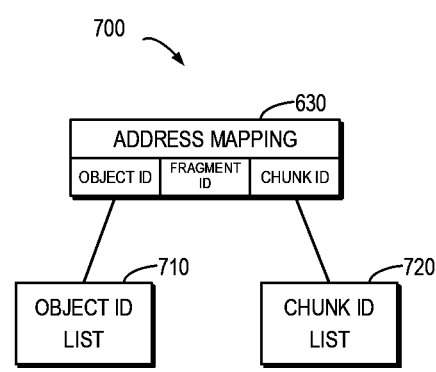
FIG. 7 schematically shows a block diagram for determining data elements with an association relation in a first dataset and a second dataset based on an address mapping according to implementations of the present disclosure.

FIG. 7 schematically shows a block diagram 700 for determining data elements associated with one another in the first dataset 110 and the second dataset 120 based on the address mapping 630 according to implementations of the present disclosure. As depicted, here the first dataset 110 may be an object ID list 710, which comprises identifiers of all objects in the storage system, namely Object1, Object2. The second dataset 120 may be a chunk ID list 720, which comprises identifiers of all to-be-reclaimed chunks in the storage system, namely Chunk01, Chunk02, Chunk03. Suppose content of the address mapping 630 is as shown in Table 1 below:

TABLE 1

Example of Address Mapping

| No. | Object ID | Fragment ID | Chunk ID |
|---|---|---|---|
| 1 | Object01 | Fragment01 | Chunk01 |
| 2 | Object01 | Fragment02 | Chunk04 |
| 3 | Object02 | Fragment01 | Chunk05 |
| 4 | Object02 | Fragment02 | Chunk06 |
| 5 | Object02 | Fragment03 | Chunk07 |

The above described method may be used to determine whether a chunk in the chunk ID list 720 meets the reclaim condition, in other words, whether a chunk in an object in the object ID list 710 is stored in a chunk in the chunk ID list 720. If a judgment result is "No," then the chunk in the chunk ID list 720 meets the reclaim condition. Since the object ID list 710 comprises two data elements, and the chunk ID list 720 comprises three data elements, the chunk ID list 720 may be searched to see whether this list comprises a data element having an association relation with Object01 and Object02. As seen from the address mapping shown in Table 1, Fragment01 in Object01 is stored in Chunk01. Therefore, Chunk01 in the chunk ID list 720 does not meet the reclaim condition.

Description has been presented to a circumstance in which the first dataset 110 comprises identifiers of objects and the second dataset 120 comprises identifiers of to-be-reclaimed chunks. According to example implementations of the present disclosure, the two datasets may exchange their content. At this point, the first dataset 110 may comprise an identifier of at least one chunk to be reclaimed from the storage system 590, and the second dataset 120 may comprise an identifier of at least one object in the object-based storage system 590.

Continuing the above-described example, at this point the given data element is a chunk identifier of a given chunk of the at least one chunk, and the process of searching for the candidate data element having an association relation with the given data element in the search dataset is similar to the above-described process. At this point, when searching in the to-be-reclaimed list, if the address mapping indicates a chunk represented by the given chunk identifiers has an association relation with an object represented by a given object identifier in the second dataset, then the given object is identified as the candidate data element.

According to example implementations of the present disclosure, if it is determined no candidate data element exists in the search dataset, the at least one chunk is reclaimed from the storage system. In the implementations, that no candidate data element exists in the search dataset means the to-be-reclaimed list does not comprise any fragment that is used by any object in the storage system. At this point, it is safe to reclaim all chunks in the list. With the foregoing example implementations, it may be verified in a quick and effective way whether a chunk in the to-be-reclaimed list may be reclaimed or not.

While examples of the method according to the present disclosure have been described in detail with reference to FIGS. 2 to 7, the implementation of a corresponding apparatus will be described below. According to example implementations of the present disclosure, there is provided an apparatus for managing a storage system. The apparatus comprises: an obtaining module configured to obtain a first dataset comprising a first number of data elements and a second dataset comprising a second number of data elements; a comparing module configured to compare the first number with the second number; a selecting module configured to select, based on a comparison result, one of the first dataset and the second dataset as a search dataset and select the other as a traverse dataset; and a searching module configured to search in the search dataset for a candidate data element, here the candidate data element has an association relation with a data element comprised in the traverse dataset.

According to example implementations of the present disclosure, the selecting module is further configured to: in response to the first number being above the second number, select the first dataset as the search dataset and select the second dataset as the traverse dataset.

According to example implementations of the present disclosure, the searching module is further configured to: for a given data element in the traverse dataset, search in the search dataset for the candidate data element having an association relation with the given data element.

According to example implementations of the present disclosure, the searching module is further configured to: obtain an index of the search dataset; and search in the search dataset for a candidate data element having an association relation with the given data element based on the index.

According to example implementations of the present disclosure, the first dataset comprises an identifier of at least one object in an object-based storage system.

According to example implementations of the present disclosure, the second dataset comprises an identifier of at least one chunk to be reclaimed from the storage system.

According to example implementations of the present disclosure, the given data element is an object identifier of a given object of the at least one object, and the searching module is further configured to: obtain an address mapping of the storage system, the address mapping describing an association relation between at least one fragment comprised in the at least one object and the at least one chunk; and identify a given chunk represented by a given chunk identifier in the second dataset as the candidate data element in response to the address mapping indicating an object represented by the given object identifier has an association relation with the given chunk.

According to example implementations of the present disclosure, the searching module is further configured to: determine at least one fragment comprised in an object represented by the object identifier based on the address mapping; and identify a given chunk represented by the given chunk identifier as the candidate data element in response to one of the at least one fragment having an association relation with the given chunk.

According to example implementations of the present disclosure, the first dataset comprises an identifier of at least one chunk to be reclaimed from the storage system.

According to example implementations of the present disclosure, the second dataset comprises an identifier of at least one object in an object-based storage system.

According to example implementations of the present disclosure, the given data element is a chunk identifier of a given chunk of the at least one chunk, and the searching module is further configured to: obtain an address mapping of the storage system, the address mapping describing an association relation with at least one fragment comprised in the at least one object and the at least one chunk; and identify a given object represented by a given object identifier in the second dataset as the candidate data element in response to the address mapping indicating a chunk represented by the given chunk identifier has an association relation with the given object.

According to example implementations of the present disclosure, further comprised is a reclaiming module configured to reclaim the at least one chunk from the storage system in response to no candidate element existing in the search dataset.

Figure 8:
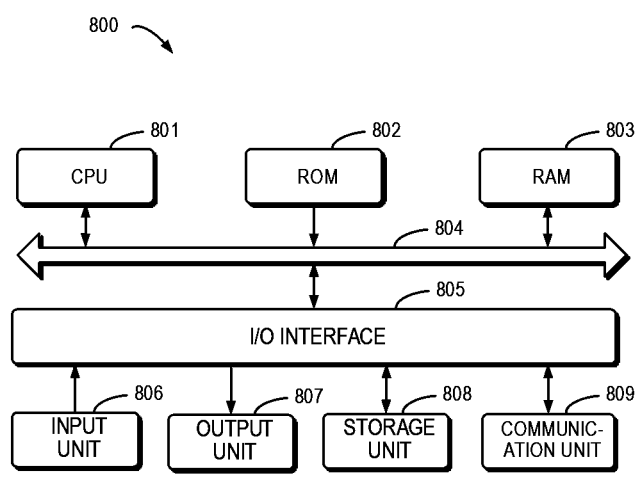
FIG. 8 schematically illustrates a block diagram of an apparatus for managing a storage system according to example implementations of the present disclosure.

FIG. 8 schematically shows a block diagram of an apparatus 800 for managing a storage system according to example implementations of the present disclosure. As depicted, the apparatus 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the apparatus 800. CPU 801, ROM 802 and RAM 803 are connected to each other via a bus 804. The input/output (I/O) interface 805 is also connected to the bus 804.

A plurality of components in the apparatus 800 is connected to the I/O interface 805, including: an input unit 806, such as keyboard, mouse and the like; an output unit 807, e.g., various kinds of display and loudspeakers etc.; a storage unit 808, such as magnetic disk and optical disk etc.; and a communication unit 809, such as network card, modem, wireless transceiver and the like. The communication unit 809 allows the apparatus 800 to exchange information/data with other devices via the computer network, such as Internet, and/or various telecommunication networks.

The above described each process and treatment, such as the method 300, can also be executed by the processing unit 801. For example, in some implementations, the method 300 can be implemented as a computer software program tangibly included in the machine-readable medium, e.g., the storage unit 808. In some implementations, the computer program can be partially or fully loaded and/or mounted to the apparatus 800 via ROM 802 and/or the communication unit 809. When the computer program is loaded to the RAM 803 and executed by the CPU 801, one or more steps of the above described method 300 can be implemented. Alternatively, in other implementations, the CPU 801 also can be configured in other suitable manners to realize the above procedure/method.

According to example implementations of the present disclosure, there is provided an apparatus for managing a storage system, the apparatus comprising: at least one processor; a volatile memory; and a memory coupled to the at least one processor, the memory having instructions stored thereon, the instructions, when executed by the at least one processor, causing the apparatus to perform acts. The acts include: obtaining a first dataset comprising a first number of data elements and a second dataset comprising a second number of data elements; comparing the first number with the second number; selecting, based on a comparison result, one of the first dataset and the second dataset as a search dataset and selecting the other as a traverse dataset; and searching in the search dataset for a candidate data element, the candidate data element having an association relation with a data element comprised in the traverse dataset.

According to example implementations of the present disclosure, in response to the first number being above the second number, the first dataset is selected as the search dataset and the second dataset is selected as the traverse dataset.

According to example implementations of the present disclosure, for a given data element in the traverse dataset, the search dataset is searched for the candidate data element having an association relation with the given data element.

According to example implementations of the present disclosure, an index of the search dataset is obtained; and the search dataset is searched for a candidate data element having an association relation with the given data element based on the index.

According to example implementations of the present disclosure, the first dataset comprises an identifier of at least one object in an object-based storage system; and the second dataset comprises an identifier of at least one chunk to be reclaimed from the storage system.

According to example implementations of the present disclosure, the given data element is an object identifier of a given object of the at least one object.

According to example implementations of the present disclosure, an address mapping of the storage system is obtained, the address mapping describing an association relation between at least one fragment comprised in the at least one object and the at least one chunk; and a given chunk represented by a given chunk identifier in the second dataset is identified as the candidate data element in response to the address mapping indicating an object represented by the given object identifier has an association relation with the given chunk.

According to example implementations of the present disclosure, at least one fragment comprised in an object represented by the object identifier is determined based on the address mapping; and a given chunk represented by the given chunk identifier is identified as the candidate data element in response to one of the at least one fragment having an association relation with the given chunk.

According to example implementations of the present disclosure, the first dataset comprises an identifier of at least one chunk to be reclaimed from the storage system.

According to example implementations of the present disclosure, the second dataset comprises an identifier of at least one object in an object-based storage system.

According to example implementations of the present disclosure, the given data element is a chunk identifier of a given chunk of the at least one chunk.

According to example implementations of the present disclosure, an address mapping of the storage system is obtained, the address mapping describing an association relation with at least one fragment comprised in the at least one object and the at least one chunk; and a given object represented by a given object identifier in the second dataset is identified as the candidate data element in response to the address mapping indicating a chunk represented by the given chunk identifier has an association relation with the given object.

According to example implementations of the present disclosure, the at least one chunk is reclaimed from the storage system in response to no candidate element existing in the search dataset.

According to example implementations of the present disclosure, there is provided a computer program product. The computer program product is tangibly stored on a computer readable medium and comprises machine executable instructions for implementing the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for processing datasets of a storage system, comprising:

obtaining a first dataset of the datasets comprising a first number of data elements and a second dataset of the datasets comprising a second number of data elements;

comparing the first number with the second number;

selecting, based on a comparison result, one of the first dataset and the second dataset as a search dataset and selecting the other as a traverse dataset; and searching in the search dataset for a candidate data element, the candidate data element having a first association relation with a data element comprised in the traverse dataset, wherein a given data element is a chunk identifier of a given chunk of the at least one chunk, and the searching in the search dataset for the candidate data element having the first association relation with the given data element comprises:

obtaining an address mapping of the storage system, the address mapping describing a second association relation with at least one fragment comprised in the at least one object and the at least one chunk; and identifying a given object represented by a given object identifier in the second dataset as the candidate data element in response to the address mapping indicating a chunk represented by the given chunk identifier has the second association relation with the given object.

2. The method of claim 1, wherein the selecting the search dataset and the traverse dataset comprises: in response to the first number being above the second number, selecting the first dataset as the search dataset and selecting the second dataset as the traverse dataset.

3. The method of claim 1, wherein the searching in the search dataset for the candidate data element comprises: for the given data element in the traverse dataset,
searching in the search dataset for the candidate data element having the first association relation with the given data element.

4. The method of claim 3, wherein the searching in the search dataset for the candidate data element having the first association relation with the given data element comprises:
obtaining an index of the search dataset; and
searching in the search dataset for the candidate data element having the first association relation with the given data element based on the index.

5. The method of claim 3, wherein:
the first dataset comprises an identifier of at least one object in an object-based storage system; and
the second dataset comprises an identifier of at least one chunk to be reclaimed from the storage system.

6. The method of claim 5, wherein the given data element is also the given object identifier of the given object of the at least one object, and the searching in the search dataset for the candidate data element having the first association relation with the given data element further comprises:
identifying the given chunk represented by a given chunk identifier in the second dataset as the candidate data element in response to the address mapping indicating an object represented by the given object identifier has the second association relation with the given chunk.

7. The method of claim 6, wherein the identifying the given chunk as the candidate data element comprises:
determining the at least one fragment comprised in the object represented by the given object identifier based on the address mapping; and
identifying the given chunk represented by the given chunk identifier as the candidate data element in response to one of the at least one fragment having the second association relation with the given chunk.

8. The method of claim 3, wherein:
the first dataset comprises an identifier of at least one chunk to be reclaimed from the storage system; and
the second dataset comprises an identifier of at least one object in an object-based storage system.

9. The method of claim 1, further comprising:
reclaiming the at least one chunk from the storage system in response to no candidate element existing in the search dataset.

10. An apparatus for managing a storage system, comprising:
at least one processor;
a volatile memory; and
a memory coupled to the at least one processor and having instructions stored thereon, the instructions, when executed by the at least one processor, causing the apparatus to perform acts comprising:
obtaining a first dataset comprising a first number of data elements and a second dataset comprising a second number of data elements, the first dataset and the second dataset being stored in a storage system;
comparing the first number with the second number;
selecting, based on a result of the comparing, one of the first dataset or the second dataset as a search dataset and selecting the other one as a traverse dataset; and
searching in the search dataset for a candidate data element, the candidate data element having an association relation with a data element comprised in the traverse dataset, wherein the association relation is a first association relation, wherein a given data element is a chunk identifier of a given chunk of the at least one chunk, and the searching in the search dataset for the candidate data element having the first association relation with the given data element comprises:
obtaining an address mapping of the storage system, the address mapping describing a second association relation with at least one fragment comprised in the at least one object and the at least one chunk; and
identifying a given object represented by a given object identifier in the second dataset as the candidate data element in response to the address mapping indicating a chunk represented by the given chunk identifier has the second association relation with the given object.

11. The apparatus of claim 10, wherein the selecting the search dataset and the traverse dataset comprises: in response to the first number being above the second number, selecting the first dataset as the search dataset and selecting the second dataset as the traverse dataset.

12. The apparatus of claim 10, wherein the searching in the search dataset for the candidate data element comprises: for the given data element in the traverse dataset,
searching in the search dataset for the candidate data element having the association relation with the given data element.

13. The apparatus of claim 12, wherein the searching in the search dataset for the candidate data element having the association relation with the given data element comprises:
obtaining an index of the search dataset; and
searching in the search dataset for the candidate data element having the association relation with the given data element based on the index.

14. The apparatus of claim 12, wherein
the first dataset comprises a first identifier of at least one object in an object-based storage system; and
the second dataset comprises a second identifier of at least one chunk to be reclaimed from the storage system.

15. The apparatus of claim 14, wherein the association relation is the first association relation, wherein the given data element is an object identifier of the given object of the at least one object, and searching in the search dataset for the candidate data element having the first association relation with the given data element comprises:
obtaining the address mapping of the storage system, the address mapping describing the second association relation between at least one fragment comprised in the at least one object and the at least one chunk; and
identifying a chunk represented by the given chunk identifier in the second dataset as the candidate data element in response to the address mapping indicating an object represented by the given object identifier has the second association relation with the given chunk, wherein the identifying the given chunk as the candidate data element comprises:
- determining at least one fragment comprised in the object represented by the object identifier based on the address mapping, and
- identifying the given chunk represented by the given chunk identifier as the candidate data element in response to one of the at least one fragment having the second association relation with the given chunk.

16. The apparatus of claim 12, wherein:
the first dataset comprises a first identifier of at least one chunk to be reclaimed from the storage system; and
the second dataset comprises a second identifier of at least one object in an object-based storage system.

17. The apparatus of claim 10, the acts further comprising:
reclaiming the at least one chunk from the storage system in response to no candidate element existing in the search dataset.

18. A computer program product, tangibly stored on a computer readable medium and comprising machine executable instructions which, when executed, cause a machine to implement operations with respect to datasets of a storage system, comprising:
- obtaining a first dataset of the datasets comprising a first number of data elements and a second dataset of the datasets comprising a second number of data elements;
- based on a result of comparing the first number with the second number, selecting, as a search dataset, the first dataset or the second dataset and selecting, as a traverse dataset, the other one not selected as the search dataset; and
- searching in the search dataset for a candidate data element, the candidate data element having an association relation with a data element comprised in the traverse dataset, wherein the association relation is a first association relation, wherein a given data element is a chunk identifier of a given chunk of the at least one chunk, and the searching in the search dataset for the candidate data element having the first association relation with the given data element comprises:
  - obtaining an address mapping of the storage system, the address mapping describing a second association relation with at least one fragment comprised in the at least one object and the at least one chunk; and
  - identifying a given object represented by a given object identifier in the second dataset as the candidate data element in response to the address mapping indicating a chunk represented by the given chunk identifier has the second association relation with the given object.

19. The method of claim 18, wherein the selecting the search dataset and the traverse dataset comprises: in response to the first number being above the second number, selecting the first dataset as the search dataset and selecting the second dataset as the traverse dataset.

20. The method of claim 18, wherein the searching in the search dataset for the candidate data element comprises: for the given data element in the traverse dataset,
searching in the search dataset for the candidate data element having the association relation with the given data element.

* * * * *